US007438495B2

(12) United States Patent
Chou et al.

(10) Patent No.: US 7,438,495 B2
(45) Date of Patent: Oct. 21, 2008

(54) SIDEWARD CLIPPING APPARATUS

(75) Inventors: Chin-Wen Chou, Taipei Hsien (TW); Hong-Yi Lee, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 0 days.

(21) Appl. No.: 11/245,161

(22) Filed: Oct. 7, 2005

(65) Prior Publication Data

US 2007/0081855 A1 Apr. 12, 2007

(51) Int. Cl.
*B25G 3/18* (2006.01)
*F16B 21/00* (2006.01)
*F16D 1/00* (2006.01)

(52) U.S. Cl. ................................ 403/322.4; 403/322.1

(58) Field of Classification Search ................ 403/321, 403/322.1, 322.3
See application file for complete search history.

(56) References Cited

U.S. PATENT DOCUMENTS 5,671,505 A * 9/1997 Anscher .................. 24/115 G
6,386,496 B1 * 5/2002 Lai et al. ................ 248/309.1
6,585,210 B1 * 7/2003 Lee ........................... 248/314
6,672,237 B2 * 1/2004 Hillier ..................... 114/230.2

FOREIGN PATENT DOCUMENTS

TW 568197 12/2003
TW M269369 U 7/2005

* cited by examiner

*Primary Examiner*—Daniel P. Stodola
*Assistant Examiner*—Nahid Amiri
(74) *Attorney, Agent, or Firm*—Muncy, Geissler, Olds, & Lowe PLLC

(57) ABSTRACT

A sideward clipping apparatus aims to clip and release an article through double-depressing actions in cyclic operations. It has a sliding member which includes an upper clipping portion and a lower clipping portion that are coupled through a first base and a second base. The lower clipping portion synchronously drives the upper clipping portion through the first base at an initial force receiving state to form a first fan moving track. The lower clipping portion is in contact with the sliding member and moved vertically to a second position under the force to drive the upper clipping portion through the second base to form a second fan moving track. Thereby the upper clipping portion and the lower clipping portion form a clipping space when the sliding member is moved to the second position to accurately clip the article.

7 Claims, 8 Drawing Sheets

SIDEWARD CLIPPING APPARATUS

FIELD OF THE INVENTION

The present invention relates to a clipping apparatus and particularly to a sideward clipping apparatus.

BACKGROUND OF THE INVENTION

A clipping apparatus mainly aims to couple two elements together or release one of the two elements through a simple operation. It generally is adopted on doors or the like. For instance, the door of the operation panel of household appliances usually uses such an apparatus. The conventional clipping apparatus have many types and are operated in different ways. They mostly adopt depressing operation. A first depressing is for coupling, and a second depressing is for releasing.

R.O.C. patent publication No. 568197 discloses a clipping apparatus which includes an anchor seat and a sliding seat. The anchor seat has a housing trough for housing an elastic U-shaped action bar and a spring on the bottom. The sliding seat has an action plate slidable in the housing trough. The action bar has two opposing suspension ends interacting with two bosses extended from two sides of the action plate through the returning elastic force of the spring. Thereby the sliding seat can be maintained on a selected position. The clipping apparatus thus formed can be operated by depressing.

The patent set forth above also discloses a prior art (FIGS. 11 through 14) of a clipping apparatus which has a case and a clipping element slidable in the case. The clipping element can slide in the case to form a clamping action to provide clipping function.

R.O.C. patent publication No. M269369 discloses a depressing clipping apparatus which provides holding and clipping function through a cyclic operation accomplished by depressing twice. It has a seat and a sliding seat. The seat has a hollow housing space to hold the sliding seat. The sliding seat has a base and a retaining portion on the bottom of the base. The base further has one side coupled with a clipping portion which is movable in a fan type. The retaining portion and the clipping portion form a clipping space between them. As previously discussed, clipping apparatus is an indispensable element in many devices. Its stability and life span are important factors to be considered when they are being used.

SUMMARY OF THE INVENTION

The primary object of the present invention is to solve the disadvantages of the conventional clipping apparatus. The present invention includes a seat which has a housing trough to hold a sliding member. The sliding member is movable in the housing trough to a first position in normal conditions and a second position in a depressed condition. The sliding member is coupled with an upper clipping portion and a lower clipping end. The lower clipping portion can synchronously drive the upper clipping portion through a first base when subject to a force at an initial stage to form a first fan moving track. The lower clipping portion is in contact with the sliding member and moved vertically under the force to the second position, and drives the upper clipping portion to form a second fan moving track. Thereby the upper and lower clipping portions form a clipping space when the sliding member is on the second position to accurately clip an article.

Another object of the present invention is to enhance clipping accuracy of the clipping apparatus. The apparatus has the first base and a second base to form clipping flexibility. Therefore, when the article to be clipped is not precisely aligned in the clipping space, the first and second bases can be moved flexibly to that the article can still be clipped securely.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
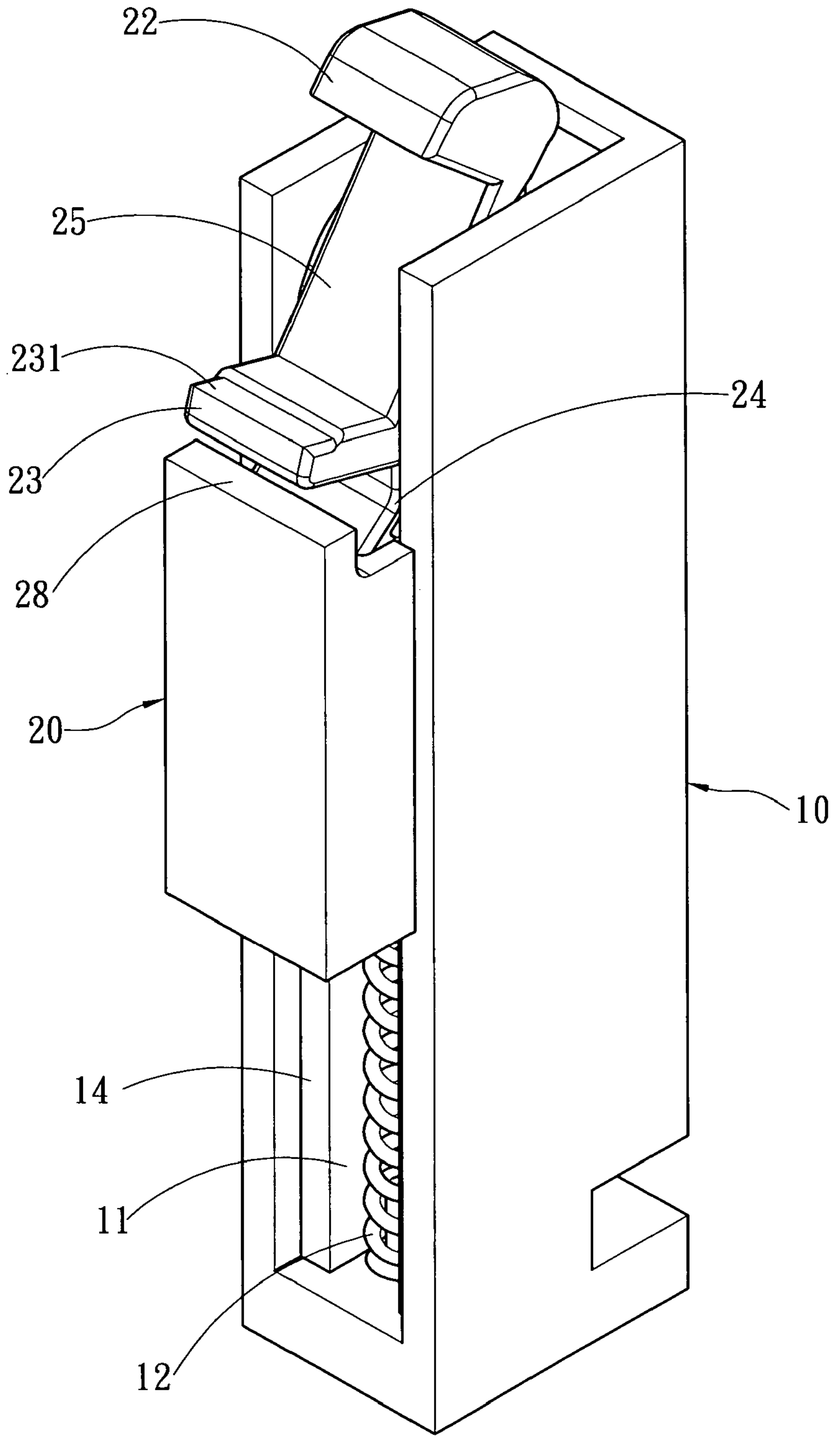
FIG. 1 is a perspective view of the present invention.
Figure 2:
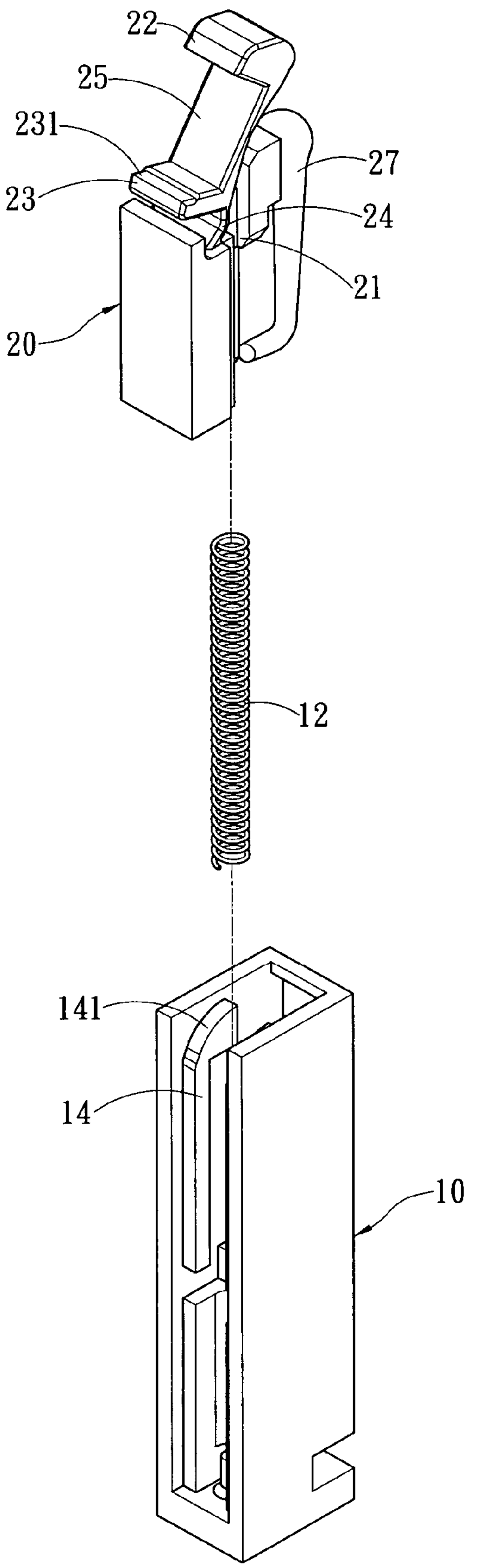
FIG. 2 is an exploded view of the present invention.

Please referring to FIGS. 1 and 2, the present invention includes a seat 10 which has a housing trough 11. The housing trough 11 houses an elastic element 12 (such as a spring) and a detent member 15. The housing trough 11 also holds a sliding member 20 which has a recess 21 to hold the elastic element 12. The elastic element 12 is coupled with the bottom of a lower clipping portion 23 in normal conditions. In the event that the elastic element 12 is a spring, the seat 10 and the sliding member 20 have respectively a first anchor boss 13 and a second anchor boss 26 to hold the elastic element 12. The sliding member 20 further has a guiding portion 27 which incorporates with the elastic element 12 to enable the sliding member 20 movable in the housing trough 11 through the elastic element 12 and the guiding portion 27 to a first position in normal conditions, and a second position when depressed. To set the first and second position without exceeding a selected range, the seat 10 has a slot to confine the movement of the sliding member 20 within the first and second positions. And the sliding member 20 has a lug running through the slot which confines the upper and lower limits of the lug and the movement of the sliding member 20. The sliding member 20 further has a first base 24 to couple with a lower clipping portion 23. The drawings illustrate an embodiment of the first base 24 in which the first base 24 is a stub shaft on the sliding member 20 and a corresponding pivot hole formed on the lower clipping portion 23. The lower clipping portion 23 is coupled with an upper clipping portion 22 through a second base 25 to form a clipping space 30 (referring to FIG. 3C) to clip an article 40. The lower clipping portion 23 has an indented clipping surface 231. The upper and lower clipping portions 22 and 23 are exposed outside the seat 10 through a corresponding displacement notch formed thereon.

Figure 3A:
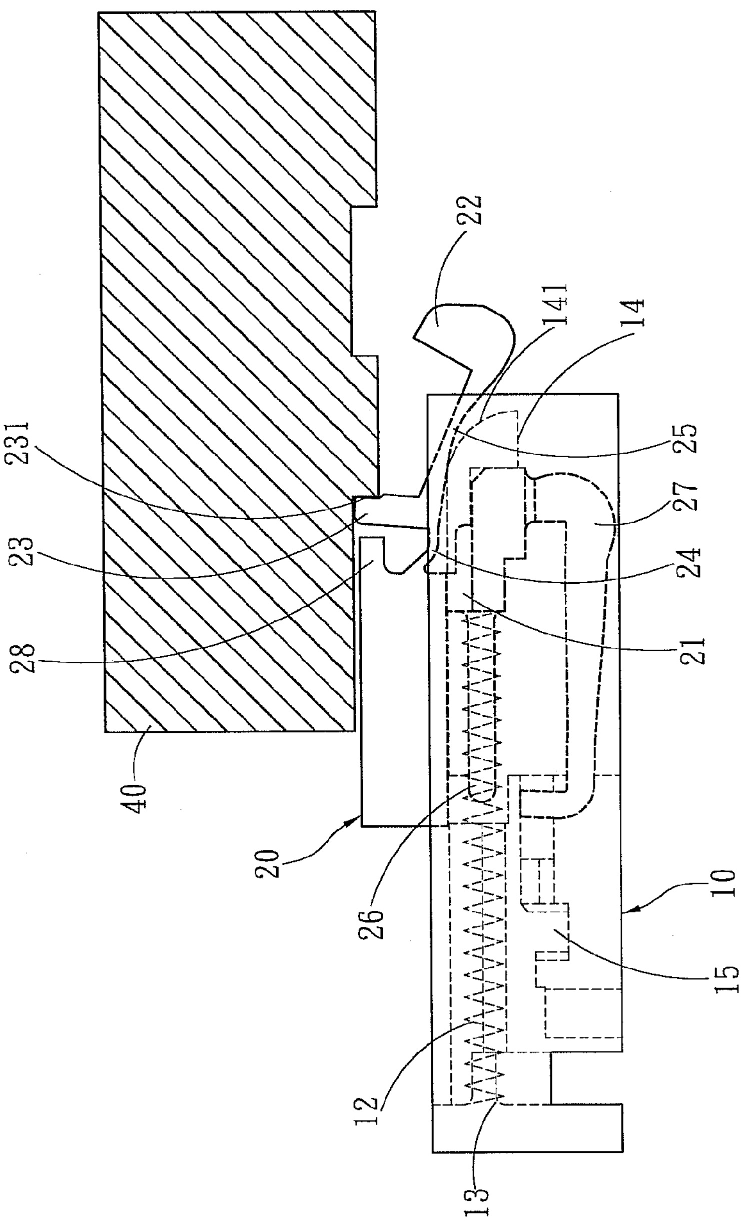
FIGS. 3A-3E are schematic views of the present invention in operating conditions.
Figure 3B:
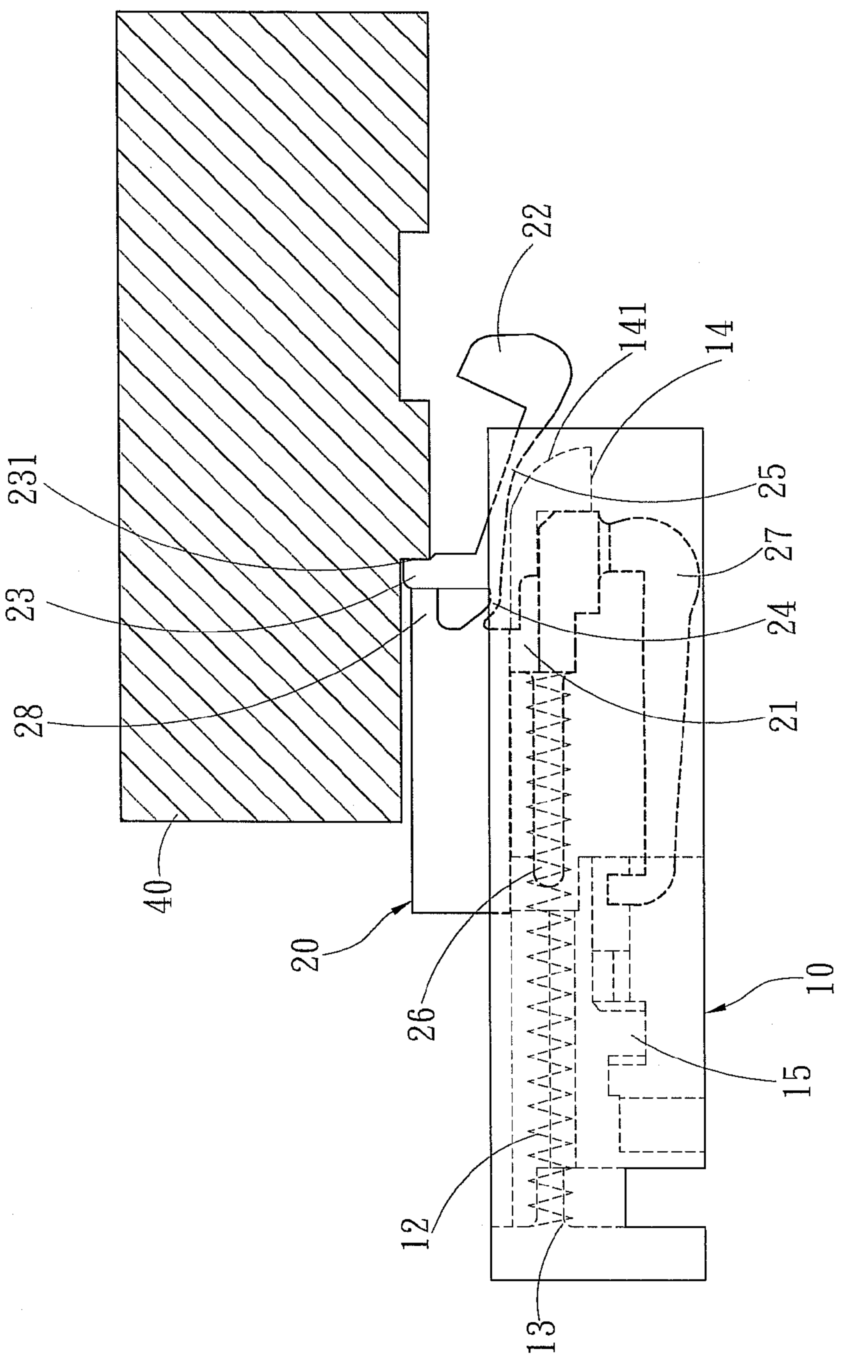
Figure 3C:
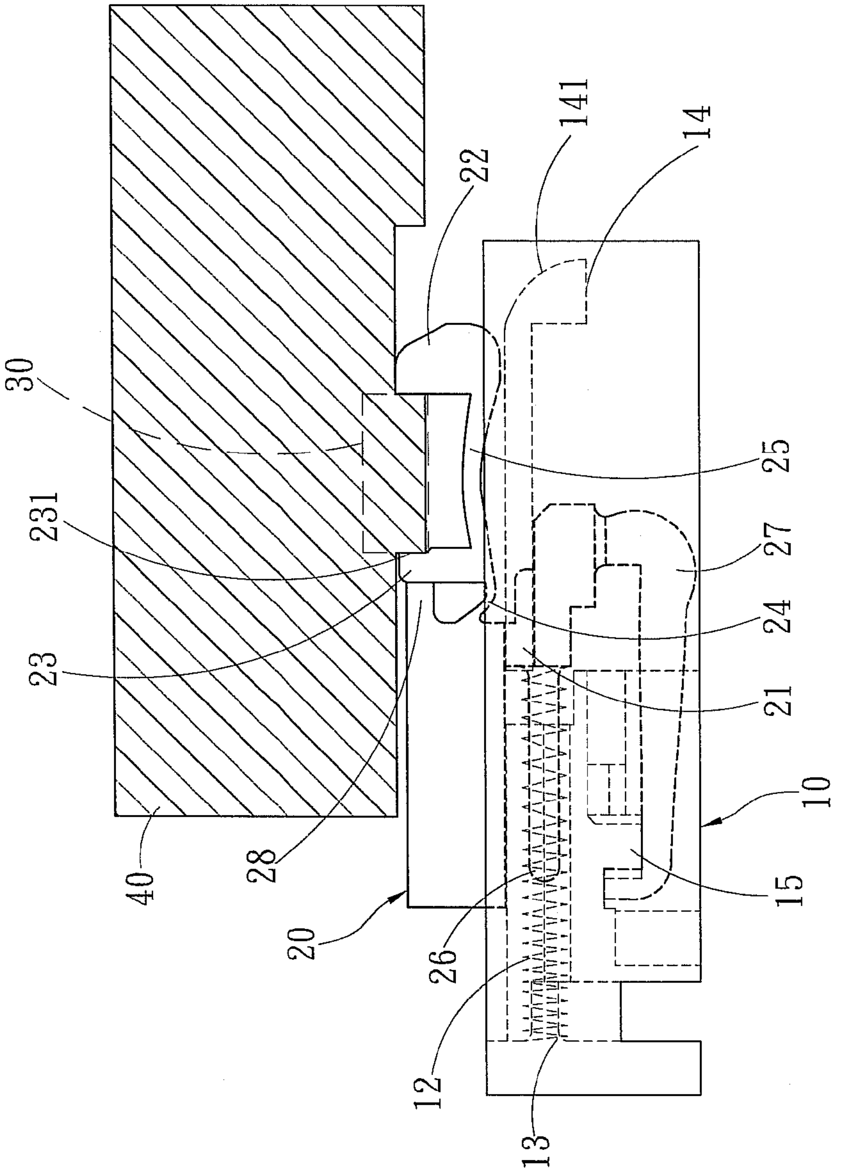
Figure 3D:
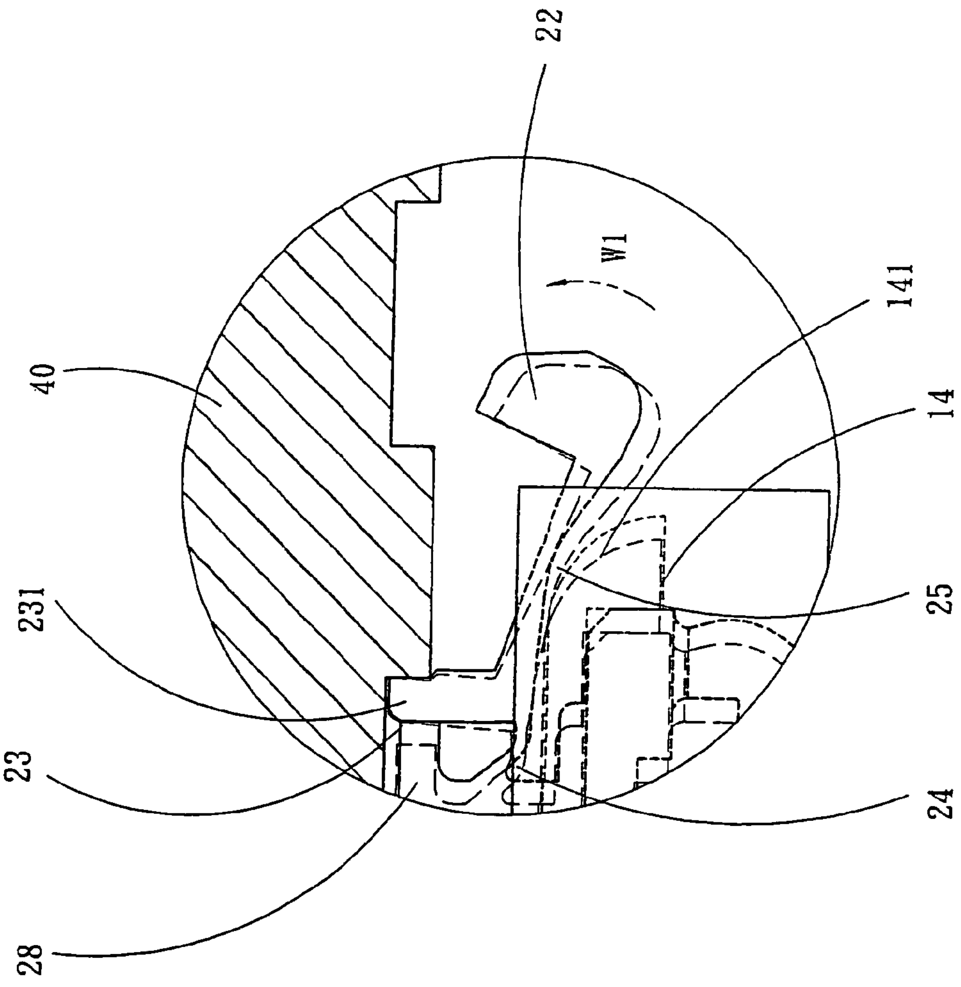
Figure 3E:
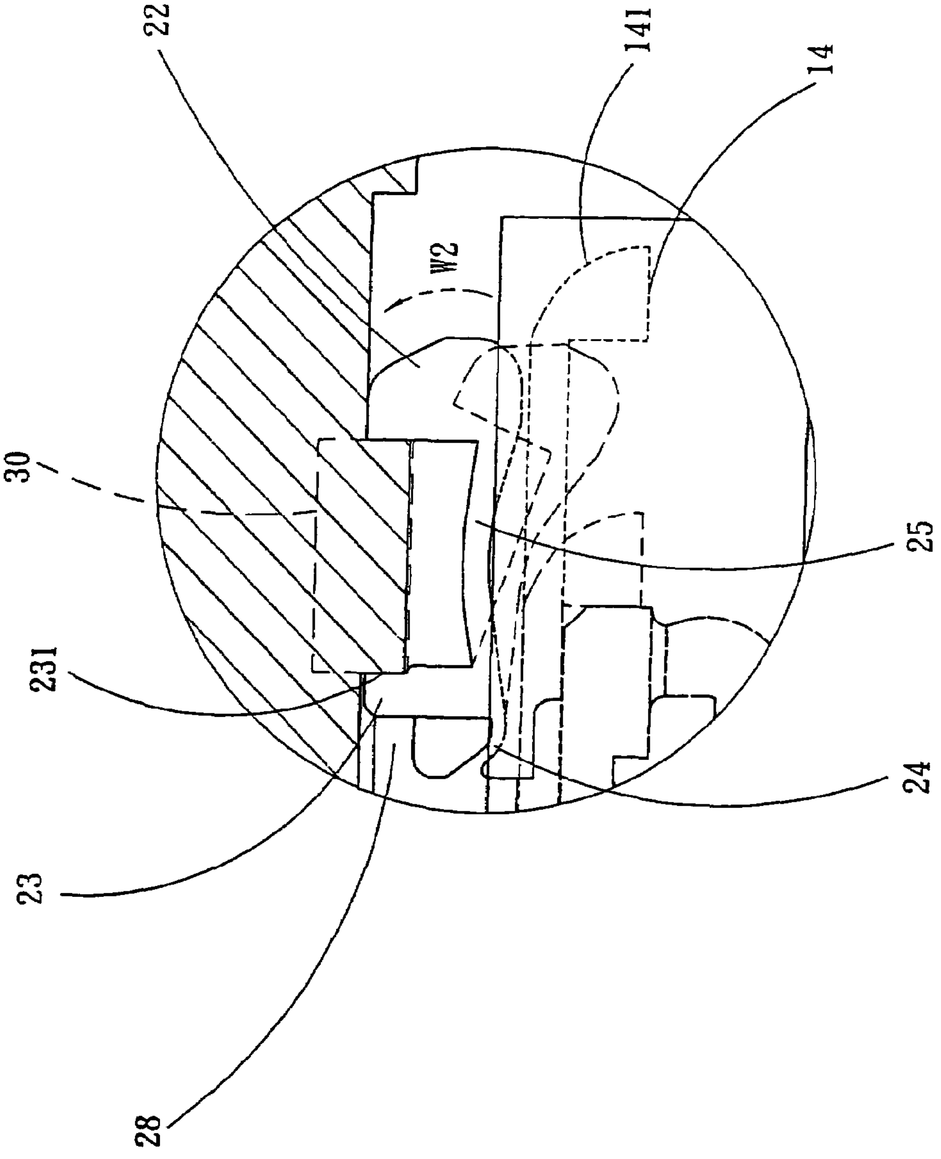

Referring to FIGS. 3A-3E, when in use, the sliding member 20 has the guiding portion 27 corresponding to the first and second positions to define a moving track of the detent member 15. The guiding portion 27 has one end located on the detent member 15 so that the sliding member 20 can be anchored on the first and second positions through the guiding portion 27 when the sliding member 20 is switched on the first and second position. FIG. 3A shows the clipping apparatus is in a free condition. FIGS. 3B and 3C illustrate that the lower clipping portion 23 receives a force at an initial stage and synchronously drives the upper clipping portion 22 through the first base 24 to form a first fan moving track W1. To aid the upper clipping portion 22 to form the first fan moving track W1, the seat 10 has a corresponding guiding track 14. When the lower clipping portion 23 is in contact with the sliding member 20 and moved vertically under force to the second position and drives the upper clipping portion 22 to form a second fan moving track W2, the upper and lower clipping portions 22 and 23 form the clipping space 30 on the second position to clip the article 40. As shown in FIGS. 3A-3C, to aid forming of the second fan moving track W1, the guiding track 14 has an arched portion 141 so that when the lower clipping portion 23 receives the force continuously, the second base 25 moves along the surface of the arched portion 141 to allow the upper clipping portion 22 to form the second fan type moving track W2. FIG. 3C shows the clipping apparatus in a dead end position to clip the article 40.

Figure 4:
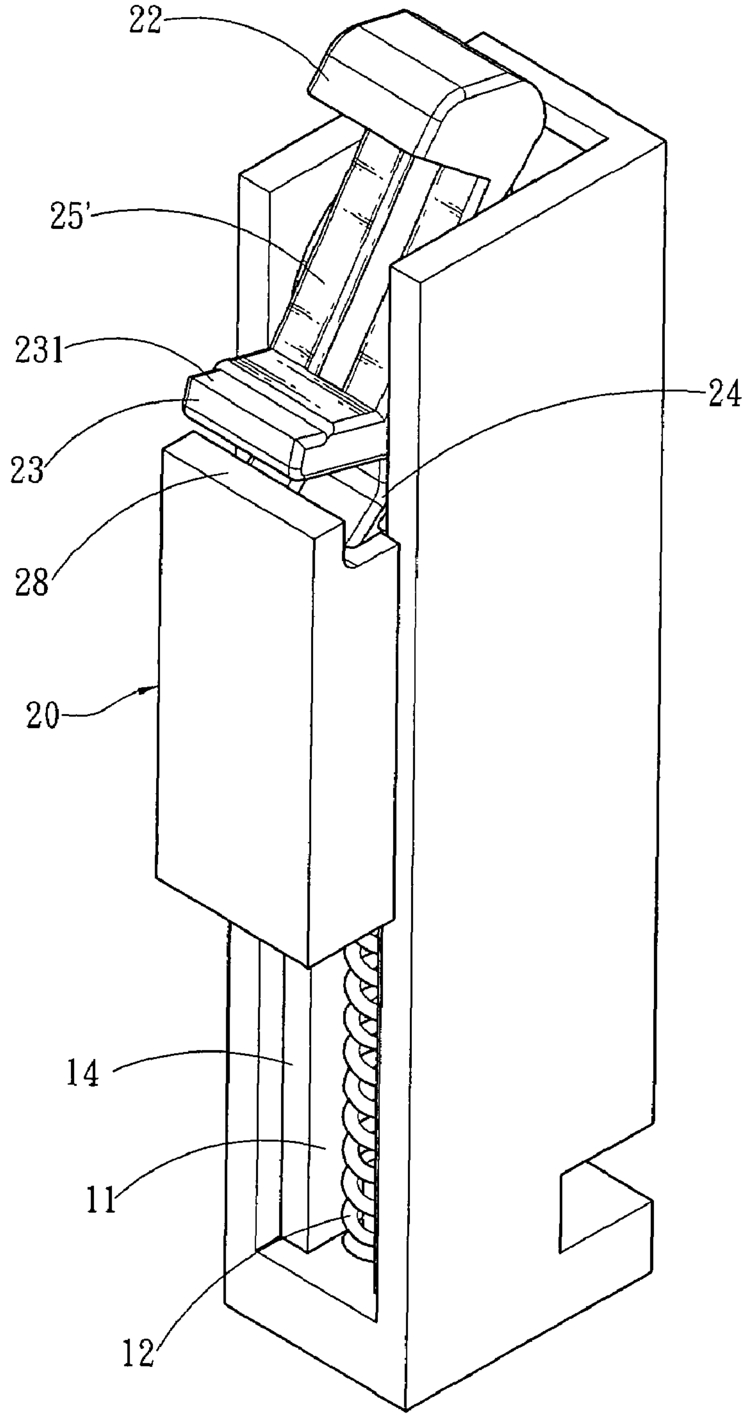
FIG. 4 is a schematic view of a second embodiment of the present invention.

FIG. 3C depicts that the article 40 is clipped accurately and securely in an optimal condition in the clipping space 30 by the upper and lower clipping portions 22 and 23. To enable the clipping portion 23 to be positioned accurately or mate the profile of the article 40, the sliding member 20 further has a bucking surface 28. Hence before the lower clipping portion 23 is being depressed to form the first and second fan moving tracks W1 and W2, it can be accurately positioned through the bucking surface 28 in the clipping space 30 to form a clipping surface, as shown in FIG. 3C. As shown in FIG. 2, the first and second fan moving tracks W1 and W2 are formed through the flexibility of the first base 24 and the second base 25. The second base 25 allows the upper clipping portion 22 to form an accurate clipping surface in the clipping space 30 through the guiding track 14. Referring to FIG. 4, which shows a second embodiment of the invention, the second base 25' further has at least an opening to reinforce the strength thereof so that the side clipping apparatus can provide more secure clipping.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A sideward clipping apparatus, comprising:

an elastic element, a seat including:

a base at a bottom of the seat, the base having a top surface, a first anchor boss located on the top surface of the base, and a housing trough to hold the elastic element, said housing trough having a detent member formed therein, the elastic element being anchored by the first anchor boss; and a sliding member located in the housing trough, the sliding member including:

a guiding portion which has one end located on the detent member and is movable in the housing trough through the elastic element to a first position when not depressed and to a second position when depressed; the detent member defining a moving track of the guiding portion corresponding to the first and the second positions; and an upper clipping portion and a lower clipping portion coupled through a first base, the lower clipping portion being coupled with the sliding member through a second base, the lower clipping portion being moved about the first base at an initial force receiving state to synchronously drive the upper clipping portion so that the upper and the lower clipping portions form a first fan moving track; and the lower clipping portion receiving the force to move vertically to a second position and driving the upper clipping portion to form a second fan moving track, thereby the upper and lower clipping portions forming a clipping space when the sliding member is moved to the second position to clip an article.

2. The sideward clipping apparatus of claim 1, wherein the seat and the sliding member respectively have a guiding track and a recess mating each other to confine the sliding member from escaping from the seat so that the sliding member is vertically movable in the housing trough.

3. The sideward clipping apparatus of claim 2, wherein the guiding track has an arched portion to aid the upper clipping portion to form the second fan moving track.

4. The sideward clipping apparatus of claim 1, wherein the sliding member has a second anchor boss to anchor the elastic element.

5. The sideward clipping apparatus of claim 4, wherein the second base has at least one opening to increase the flexibility of the second base, and the first anchor boss penetrates into the elastic element.

6. The sideward clipping apparatus of claim 1, wherein the second base has at least one opening to increase the flexibility of the second base.

7. The sideward clipping apparatus of claim 1, wherein the first anchor boss penetrates into the elastic element.

* * * * *